US012631436B2

(12) United States Patent
Kobayashi et al.

(10) Patent No.: US 12,631,436 B2
(45) Date of Patent: May 19, 2026

(54) TRAVELING VEHICLE SYSTEM

(71) Applicant: Murata Machinery, Ltd., Kyoto (JP)

(72) Inventors: Makoto Kobayashi, Ise (JP); Tasuku Ishikawa, Ise (JP)

(73) Assignee: Murata Machinery, Ltd., Kyoto (JP)

( * ) Notice: Subject to any disclaimer, the term of this patent is extended or adjusted under 35 U.S.C. 154(b) by 334 days.

(21) Appl. No.: 18/686,898

(22) PCT Filed: Mar. 11, 2022

(86) PCT No.: PCT/JP2022/011038
§ 371 (c)(1),
(2) Date: Feb. 27, 2024

(87) PCT Pub. No.: WO2023/032293
PCT Pub. Date: Mar. 9, 2023

(65) Prior Publication Data
US 2024/0353213 A1     Oct. 24, 2024

(30) Foreign Application Priority Data

Aug. 31, 2021    (JP) ................................. 2021-141695

(51) Int. Cl.
*G01B 5/10*          (2006.01)
(52) U.S. Cl.
CPC ...................................... *G01B 5/10* (2013.01)
(58) Field of Classification Search
CPC ...................................... G01B 5/08; G01B 5/10
USPC ........................... 33/203, 203.12, 550, 555.1
See application file for complete search history.

(56) References Cited

U.S. PATENT DOCUMENTS

| | | | | |
|---|---|---|---|---|
| 4,958,442 A | * | 9/1990 | Eckhardt .................. | G01B 5/08 |
| | | | | 33/783 |
| 5,199,176 A | * | 4/1993 | Theurer ................... | B61K 9/08 |
| | | | | 33/651.1 |
| 5,660,470 A | * | 8/1997 | Mench .................... | G01J 5/041 |
| | | | | 33/651 |
| 5,864,053 A | * | 1/1999 | Nozaki ............... | G01M 17/045 |
| | | | | 33/336 |

(Continued)

FOREIGN PATENT DOCUMENTS

| | | |
|---|---|---|
| JP | 56-052154 | 5/1981 |
| JP | S59-172313 U | 11/1984 |

(Continued)

OTHER PUBLICATIONS

English translation of the International Preliminary Report on Patentability and Written Opinion dated Mar. 14, 2024, of counterpart International Application No. PCT/JP2022/011038.

(Continued)

*Primary Examiner* — George B Bennett
(74) *Attorney, Agent, or Firm* — DLA Piper LLP (US)

(57)          ABSTRACT

A traveling vehicle that includes a traveling roller travels on a rail. The traveling vehicle system is provided with a measurement device. The measurement device includes: an upper measurement plate configured to be brought into contact with the traveling roller from above; a lower measurement plate configured to be brought into contact with the traveling roller from below; and a detector configured to detect height positions of the upper measurement plate and the lower measurement plate.

6 Claims, 9 Drawing Sheets

(56)                 References Cited

U.S. PATENT DOCUMENTS

| | | | | |
|---|---|---|---|---|
| 6,070,332 | A * | 6/2000 | Kane ...................... | G01B 5/255 |
| | | | | 33/203.13 |
| 6,754,973 | B2 * | 6/2004 | Takahashi ................ | G01B 5/08 |
| | | | | 33/553 |
| 12,305,977 | B2 * | 5/2025 | Lambrecht ............ | G01M 17/06 |
| 2017/0169145 | A1 | 6/2017 | Ehmke et al. | |
| 2026/0048769 | A1 * | 2/2026 | Kobayashi .............. | B61B 13/12 |

FOREIGN PATENT DOCUMENTS

| | | |
|---|---|---|
| JP | 2000-203429 | 7/2000 |
| JP | 2005-221280 | 8/2005 |
| JP | 2020-197473 | 12/2020 |
| JP | 2021-046287 | 3/2021 |
| WO | 2016/030009 | 3/2016 |

OTHER PUBLICATIONS

International Search Report dated Jun. 7, 2022, of counterpart International Application No. PCT/JP2022/011038, along with an English translation.

* cited by examiner

*Fig.2*
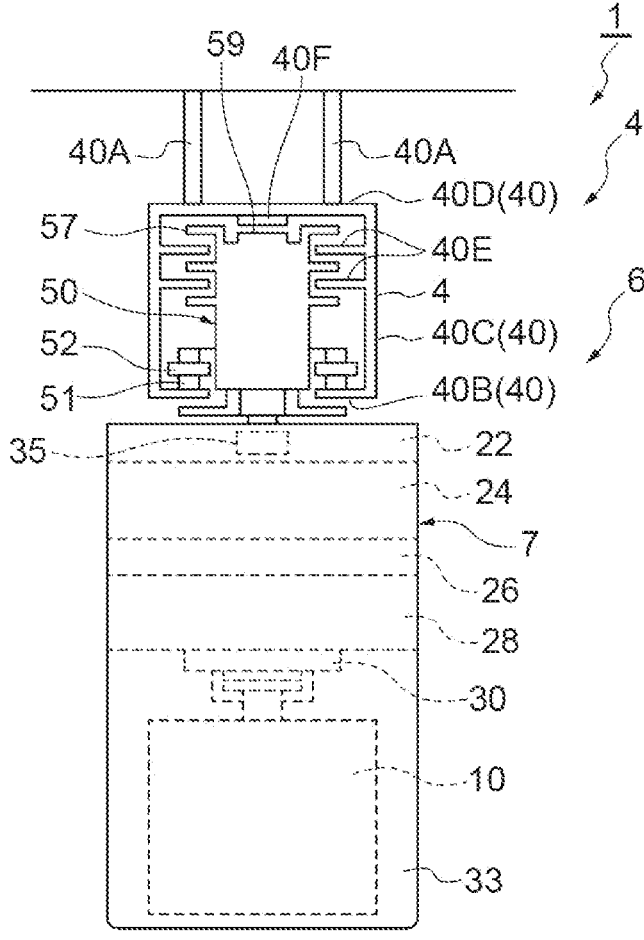
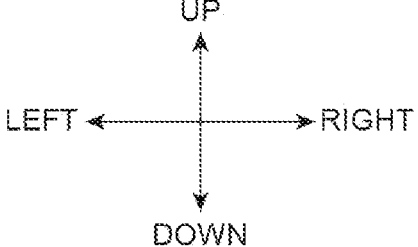

TRAVELING VEHICLE SYSTEM

TECHNICAL FIELD

This disclosure relates to a traveling vehicle system.

BACKGROUND

Conventionally, in the field of article transport vehicles, a wheel-diameter measurement device configured to measure the diameter of a wheel rolling on a traveling surface of a rail is known from Japanese Unexamined Patent Publication No. 2020-197473 and Japanese Unexamined Patent Publication No. 2021-046287, for example. The device described in Japanese Unexamined Patent Publication No. 2020-197473 includes an optical sensor having a light emitter and a light receiver, and measures the diameter of a wheel using two strip-shaped detection beams spaced apart in an extending direction of a rail. More specifically, the size of an area of the first strip-shaped beam in the extending direction, which is blocked by the wheel, is defined as a first numerical value, the size of an area of the second strip-shaped beam in the extended direction, which is blocked by the wheel, is defined as a second numerical value, and the wheel diameter is measured based on the separation distance between the first and second strip-shaped beams and the first and second numerical values. The detection beams pass through through-holes formed in the rail. The device described in Japanese Unexamined Patent Publication No. 2021-046287 includes two pairs of transmissive sensors. Each pair of transmissive sensors includes an upper sensor and a lower sensor that are spaced apart in the vertical direction.

In the conventional technology described above, the light emitter and the light receiver each need to be provided in plurality, and thus the configuration of the measurement device tends to be complicated. If an object different from the wheel (such as a foreign object) is present in optical paths of the detection beams, or if dust adheres to the optical sensors, there may be a situation in which the diameter of the wheel (traveling roller) cannot be accurately measured.

It could therefore be helpful to provide a traveling vehicle system that can easily and accurately measure the diameter of a traveling roller.

SUMMARY

A traveling vehicle system in which a traveling vehicle including a traveling roller travels on a rail and a measurement device is provided, the measurement device including: an upper measurement plate configured to be brought into contact with the traveling roller from above; a lower measurement plate configured to be brought into contact with the traveling roller from below; and a detector configured to detect height positions of the upper measurement plate and the lower measurement plate.

The upper measurement plate and the lower measurement plate are brought into contact with the traveling roller above and below the traveling roller. The diameter of the traveling roller is measured by detecting the height positions of the upper measurement plate and the lower measurement plate by the detector. As described above, only two plates need to be brought into contact with the traveling roller, and thus the diameter can be easily measured. Unlike optical measurement, the height positions of the plates are detected by using physical contact, which enables accurate measurement of the diameter. The two upper and lower plates can be easily disposed in positions where the rolling area (passing area) of the traveling roller is kept away therefrom. Thus, the configuration can be further simplified than when, for example, two plates are used on the left and right sides.

The lower measurement plate may be biased upward to a standby position where the lower measurement plate is able to be in contact with the traveling roller, and may be moved downward by entry of the traveling roller. This configuration eliminates the need for an actuator configured to move the lower measurement plate up and down, which allows the structure to be simpler.

The upper measurement plate may be biased upward to a retreat position where the upper measurement plate is separated from the traveling roller. This configuration can prevent collision between the upper measurement plate and the traveling roller.

With attitude of the traveling vehicle being maintained by another part of the traveling vehicle separate from the traveling roller, the upper measurement plate and the lower measurement plate may be brought into contact with the traveling roller. This configuration can prevent the traveling roller from being deformed by load. Thus, the diameter of the traveling roller can be measured more accurately.

The other part may be another traveling roller separate from the traveling roller. By using a configuration provided for traveling of the traveling vehicle to maintain the attitude of the traveling vehicle, the diameter of the traveling roller can be easily and accurately measured.

The measurement device may be incorporated in a midpoint of the rail or may be provided on an extension of the rail. With this configuration, the diameter of the traveling roller could be measured after the traveling vehicle is moved along the rail to the position of the measurement device. The traveling vehicle does not have to be moved to a position separated from the rail.

The diameter of the traveling roller can thus be easily and accurately measured.

BRIEF DESCRIPTION OF THE DRAWINGS

FIG. 2 is a schematic front view of a traveling vehicle as viewed from a traveling direction.

REFERENCE SIGNS LIST

Figure 1:
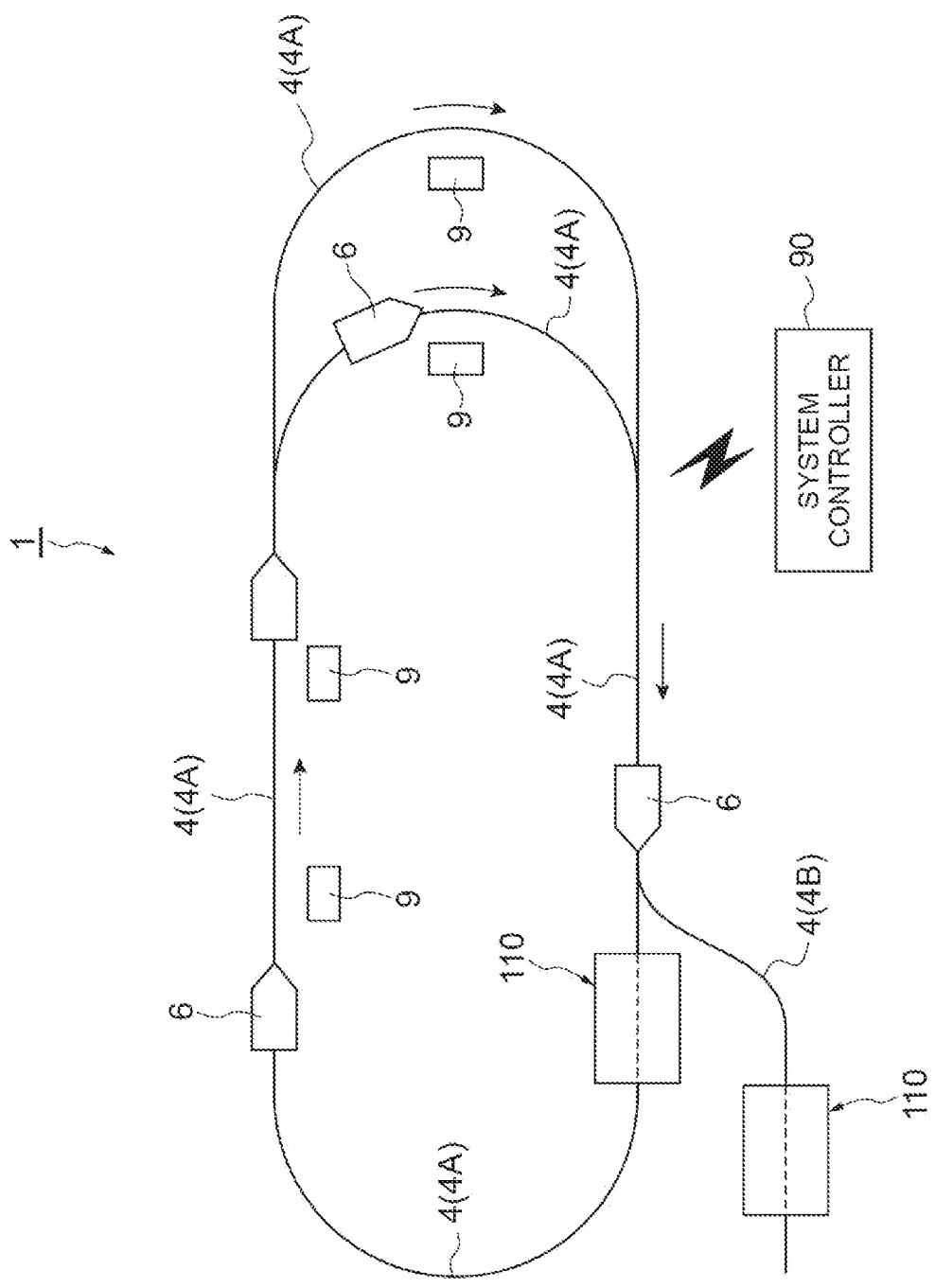
FIG. 1 is a schematic plan view illustrating a traveling vehicle system according to an example.

1 traveling vehicle system
4 traveling rail (rail)
6 traveling vehicle

40B lower surface portion
41 traveling surface
42 opening
51 outer wheel (traveling roller)
55 inner wheel (another traveling roller)
61 upper measurement plate
62 lower measurement plate
63 upper detector
64 lower detector
67 spring
70 actuator
71 motor
72 gear
73 coupling
74 rack gear
75 eccentric cam
76 rotating shaft
100 diameter measurement device (measurement device)
110 measurement unit
P1 retreat position
P3 contact position

DETAILED DESCRIPTION

An example will be described in detail below with reference to the drawings. In the description of the drawings, the same or equivalent elements are denoted by the same reference signs and overlapping description is omitted. The terms "up" and "down" correspond to the vertical direction, the terms "front" and "back" correspond to a direction in which a traveling vehicle travels, and terms "left" and "right" correspond to a direction orthogonal to the vertical direction and the front-back direction.

As illustrated in FIGS. 1 and 2, a traveling vehicle system 1 is a system for transporting an article 10 between placement sections 9 and 9 using a traveling vehicle 6 movable along a traveling rail 4. Examples of the article 10 include containers such as a front opening unified pod (FOUP) storing a plurality of semiconductor wafers and a reticle pod storing a glass substrate, and common parts. The traveling vehicle system 1 in which, for example, the traveling vehicle 6 travels along the one-way traveling rail 4 laid on a ceiling or the like in a factory or the like will be described as an example. The traveling vehicle system 1 includes the traveling rail 4, a plurality of the traveling vehicles 6, a plurality of placement sections 9, and a measurement unit 110.

The traveling rail 4 is a track laid, for example, in the vicinity of a ceiling that is a space above the worker's head. The traveling rail 4 is suspended from the ceiling. The traveling rail 4 is a predetermined traveling path for the traveling vehicles 6 to travel. The traveling rail 4 is supported by struts 40A and 40A. Traveling rail 4 includes a main-line traveling rail (main-line route) 4A for traveling in one direction around a predetermined area and an introduction traveling rail (introduction route) 4B for introducing each traveling vehicle 6 to the main-line traveling rail 4A.

The traveling rail 4 includes a rail body 40 having a C-shaped cross section including a pair of lower surface portions 40B, a pair of side surface portions 40C and 40C, a top surface portion 40D, a power feeder 40E, and a magnetic plate 40F. The lower surface portions 40B extend in the traveling direction of the traveling vehicle 6 and form a lower surface of the rail body 40. The lower surface portions 40B are plate-like members to allow outer wheels (traveling rollers) 51 of the traveling vehicle 6 to roll and travel. The side surface portions 40C extend in the traveling direction of the traveling vehicle 6 and form a side surface of the rail body 40. The top surface portion 40D extends in the traveling direction of the traveling vehicle 6 and forms an upper surface of the rail body 40.

The power feeder 40E is a part configured to supply electricity to power receiving cores 57 of the traveling vehicle 6 and transmit and receive a signal to and from (perform duplex communication with) the traveling vehicle 6. The power feeder 40E is fixed to each of the pair of side surface portions 40C and 40C and extends along the traveling direction. The power feeder 40E supplies electricity to the power receiving core 57 in a contactless manner. The magnetic plate 40F causes a linear DC motor (LDM) 59 of the traveling vehicle 6 to produce magnetic force for traveling or stopping. The magnetic plate 40F is fixed to the top surface portion 40D and extends along the traveling direction.

The traveling vehicle 6 travels along the traveling rail 4 and transports the article 10. The traveling vehicle 6 is configured to be able to transfer the article 10. The traveling vehicle 6 is an automated overhead traveling vehicle. The number of traveling vehicles 6 included in the traveling vehicle system 1 is not particularly limited and is more than one. The traveling vehicles 6 are also referred to as transport vehicles, overhead traveling vehicles, overhead transport vehicles, or traveling carriers, for example. Each traveling vehicle 6 includes a main body 7, a traveling unit 50, and a traveling vehicle controller (not illustrated). The main body 7 includes a body frame 22, a lateral feed unit 24, a θ drive 26, an elevation driver 28, an elevation stage 30, and a front-back frame 33.

The lateral feed unit 24 laterally feeds the θ drive 26, the elevation driver 28, and the elevation stage 30 collectively in a direction perpendicular to the traveling direction of the traveling rail 4. The θ drive 26 turns at least one of the elevation driver 28 and the elevation stage 30 within a predetermined angle range in a horizontal plane. The elevation driver 28 elevates and lowers the elevation stage 30 by reeling or unreeling a suspension member such as a belt, a wire, and a rope. The elevation stage 30 has a chuck and can grip or release the article 10. A pair of the front-back frames 33 are provided, for example, on the front and the back of the traveling vehicle 6 in the traveling direction. The front-back frames 33 extend and retract not-illustrated claws or the like and prevent the article 10 from dropping during transportation.

Figure 3:
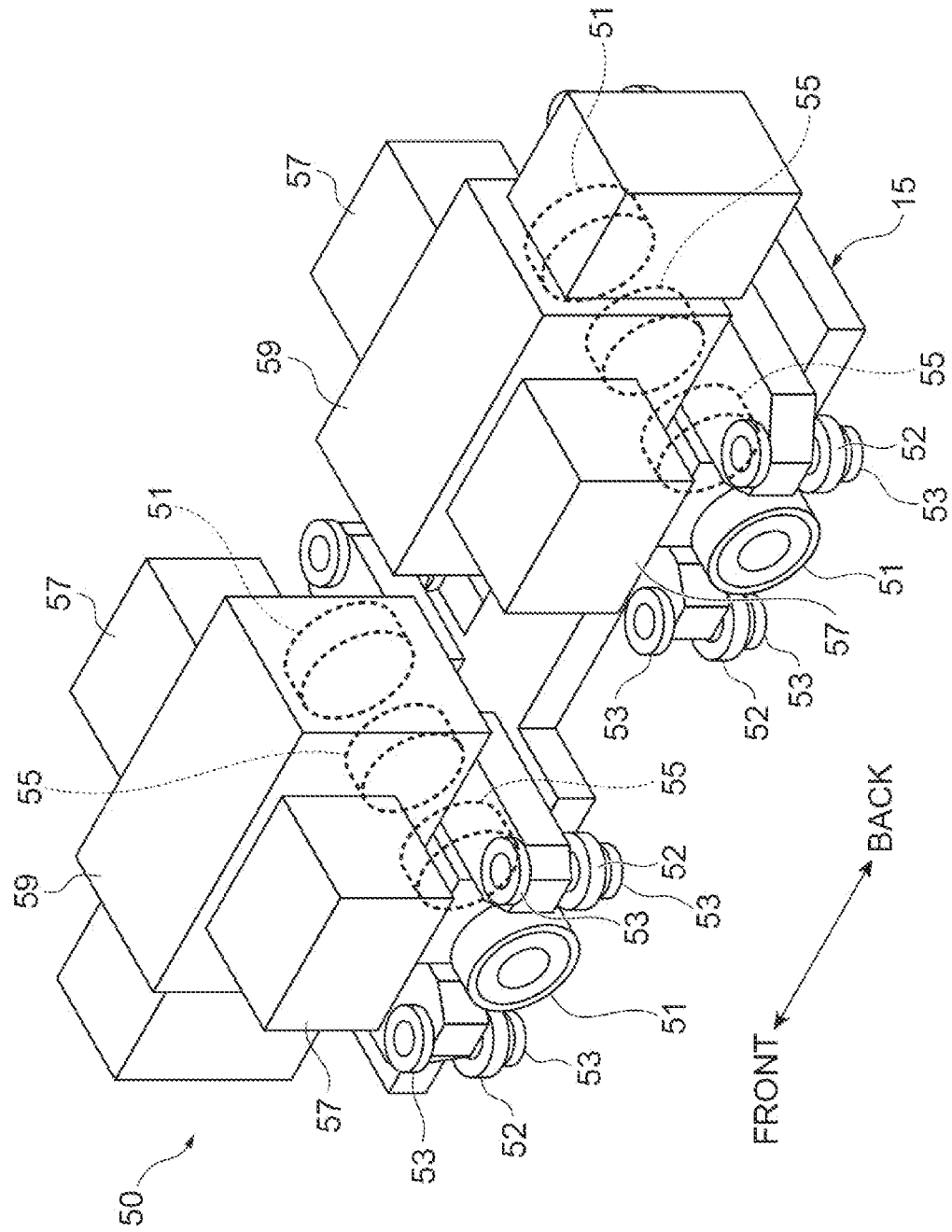
FIG. 3 is a perspective view illustrating a traveling unit of the traveling vehicle.

The traveling unit 50 allows the traveling vehicle 6 to travel along the traveling rail 4. In other words, the traveling vehicle 6 travels on the lower surface portions 40B of the traveling rail 4. As illustrated in FIG. 3, the traveling unit 50 includes the outer wheels 51, inner wheels 55, side rollers 52, branching rollers 53, the power receiving cores 57, and the LDMs 59. In FIG. 2, the inner wheels 55 and the branching rollers 53 are not illustrated.

In the traveling vehicle 6, for example, a pair of left and right outer wheels 51 are provided in two sets on the front and the back thereof. The outer wheels 51 are disposed on the left and right ends at the front and the back of the traveling unit 50. A pair of left and right inner wheels 55 are also provided in two sets on the front and the back. On each of the front and the back, the pair of left and right inner wheels 55 are disposed between the pair of left and right outer wheels 51. The outer wheels 51 and the inner wheels 55 may be provided in three or more sets aligned in the front-back direction, or may be provided in only one set. The outer wheels 51 and the inner wheels 55 are made of, for example, resin such as urethane.

The outer wheels 51 roll on the pair of lower surface portions 40B, 40B of the traveling rail 4. The side rollers 52 are disposed to sandwich the outer wheels 51 in the front-back direction. The side rollers 52 are provided to be able to come into contact with the side surface portions 40C of the traveling rail 4 (or side support portions 45 in FIG. 8 described later). The branching rollers 53 are disposed to sandwich the side rollers 52 in the vertical direction. The side rollers 52 are provided to be able to come into contact with a guide (not illustrated) disposed at a connection section, a branching section or the like of the traveling rail 4.

The power receiving cores 57 are disposed at the front and the back of the traveling unit 50 to sandwich the LDM 59 in the left-right direction. The power receiving cores 57 performs contactless power reception from the power feeder 40E disposed at the traveling rail 4 and contactless transmission/reception of a variety of signals to/from the traveling vehicle controller. The LDMs 59 are provided at the front and the back of the traveling unit 50. Each LDM 59 uses an electromagnet to produce magnetic force to travel or stop between the LDM 59 and the magnetic plate 40F disposed on the upper surface of the traveling rail 4.

As illustrated in FIG. 1, the placement sections 9 are arranged along the traveling rail 4 and provided at positions where the article 10 can be delivered by the traveling vehicle 6. The placement sections 9 each include a buffer and a delivery port. The buffer is a placement section on which the article 10 is temporarily placed. The buffer is a placement section on which the article 10 is temporarily placed when the article 10 transported by the traveling vehicle 6 cannot be transferred to a target delivery port, for example, for the reason that another article 10 has been placed on the target delivery port. The delivery port is, for example, a placement section for delivering the article 10 to and from a semiconductor processing device (not illustrated) such as a cleaning device, a deposition device, a lithography device, an etching device, a thermal treatment device, and a planarization device. The processing device is not limited to a specific device and may be a variety of devices.

For example, the placement sections 9 that are buffers are arranged to the side of the traveling rail 4. In this example, the traveling vehicle 6 delivers an article 10 to and from a placement section 9 by causing the lateral feed unit 24 to laterally feed the elevation driver 28 or the like and by slightly elevating and lowering the elevation stage 30. Although not illustrated, the placement sections 9 may be arranged immediately below the traveling rail 4. In this example, the traveling vehicle 6 delivers the article 10 to and from the placement section 9 by elevating and lowering the elevation stage 30.

The traveling vehicle controller is an electronic control unit including a central processing unit (CPU), a read only memory (ROM), and a random access memory (RAM). The traveling vehicle controller controls various operations in the traveling vehicle 6. Specifically, the traveling vehicle controller controls the traveling unit 50, the lateral feed unit 24, the θ drive 26, the elevation driver 28, and the elevation stage 30. The traveling vehicle controller 35 can be configured, for example, as software that is a program stored in the ROM, loaded into the RAM, and executed by the CPU. The traveling vehicle controller may be configured as hardware with electronic circuitry, for example. The traveling vehicle controller communicates with a system controller 90 (see FIG. 1) using, for example, the power feeder 40E (feeder line) of the traveling rail 4.

The system controller 90 is an electronic control unit including a CPU, a ROM, a RAM and the like. The system controller 90 can be configured, for example, as software that is a program stored in the ROM, loaded into the RAM, and executed by the CPU. The system controller 90 may be configured as hardware with electronic circuitry, for example. The system controller 90 transmits a transportation command to the traveling vehicle 6 to transport the article 10.

As illustrated in FIG. 1, the measurement unit 110 is disposed on each of the main-line traveling rail 4A and the introduction traveling rail 4B. When the measurement unit 110 is disposed on the main-line traveling rail 4A, the measurement unit 110 is incorporated in a midpoint of the traveling rail 4. When the measurement unit 110 is disposed on the introduction traveling rail 4B, it is provided on an extension of the traveling rail 4.

Figure 4:
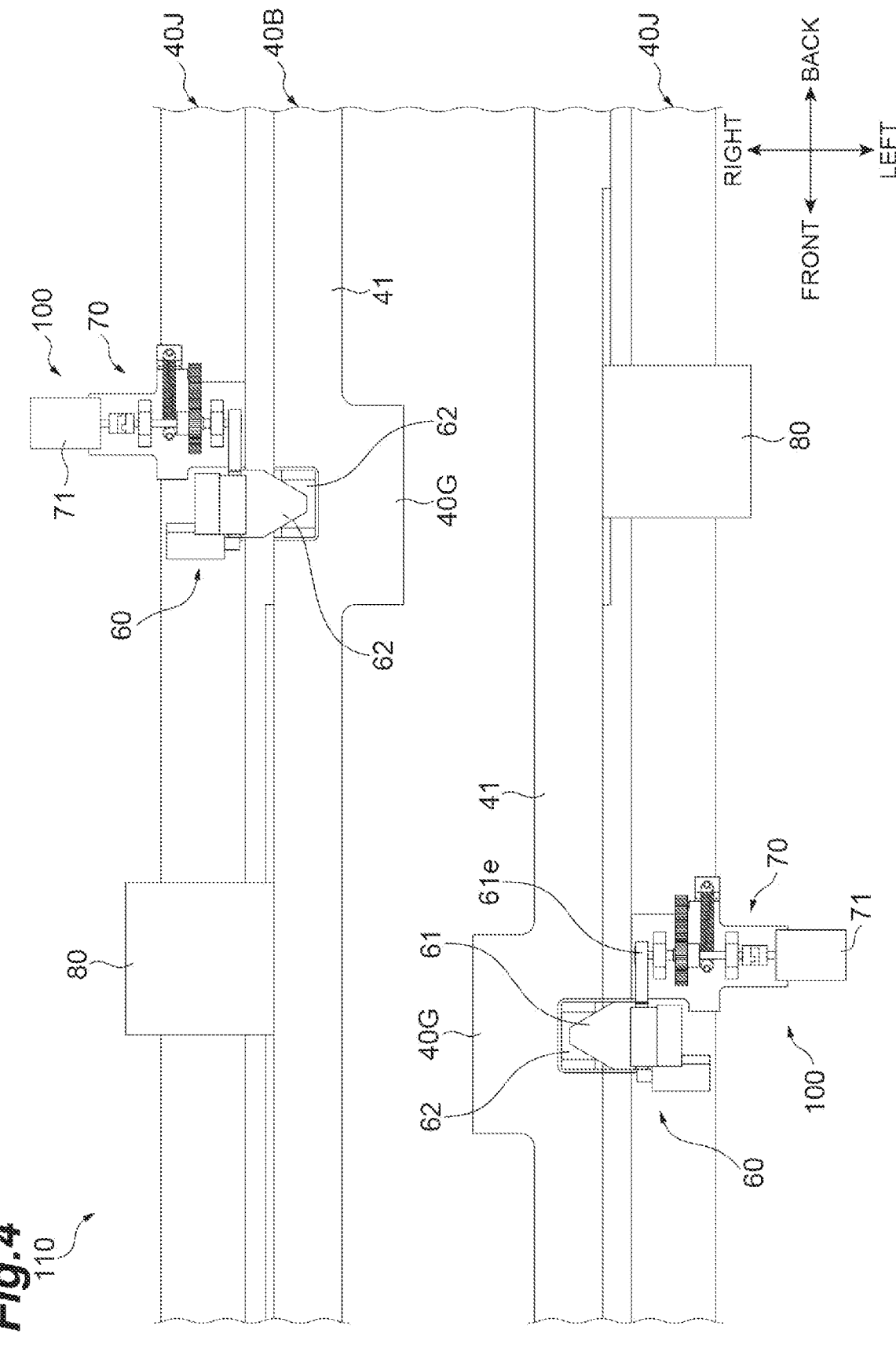
FIG. 4 is a plan view illustrating measurement devices incorporated into a rail.

As illustrated in FIG. 4, the measurement unit 110 includes dimension measurement devices 80 configured to measure various dimensions of the traveling vehicle 6 and diameter measurement devices (measurement devices) 100 configured to measure the diameters of the outer wheels 51. The dimension measurement devices 80 measure, for example, the heights of the power receiving cores 57 and the heights of the LDMs 59, the distances between the left and right side rollers 52, and the inner positions of the branching rollers 53 in the left-right direction. For example, non-contact distance sensors of an optical type, an ultrasonic type, or another type or transmissive sensors or the like are used for measurement in the dimension measurement devices 80. Measurement of dimensions in the dimension measurement devices 80 can be performed in accordance with the configuration and the procedure disclosed in, for example, Japanese Unexamined Patent Publication No. 2021-046287 described above. In contrast, the diameter measurement devices 100 are installed specifically to measure the diameters of the outer wheels 51. The dimension measurement devices 80 may be capable of measuring the diameters of the outer wheels 51 and/or the diameters of the inner wheels 55. In this example, the dimension measurement devices 80 may measure, by optical distance sensors, the diameters of the outer wheels 51 and/or the inner wheel 55 in the front-back direction or the diameters thereof in the vertical direction, for example.

Each dimension measurement device 80 and the corresponding diameter measurement device 100 are provided at opposed positions in the left-right direction. Furthermore, the dimension measurement devices 80 and the diameter measurement devices 100 are provided in two sets aligned at a predetermined distance in the front-back direction. For example, when a dimension measurement device 80 is positioned on the right side of the front of the traveling vehicle 6 and a diameter measurement device 100 is positioned on the left side of the front, a diameter measurement device 100 is positioned on the right side of the back of the traveling vehicle 6 and a dimension measurement device 80 is positioned on the left side of the back. In other words, assuming that a rectangle has vertices at positions of the two sets of outer wheels 51 (four outer wheels 51 in total) at the front and the back in plan view, the two diameter measurement devices 100 are disposed on the diagonals of this rectangle.

Figure 5:
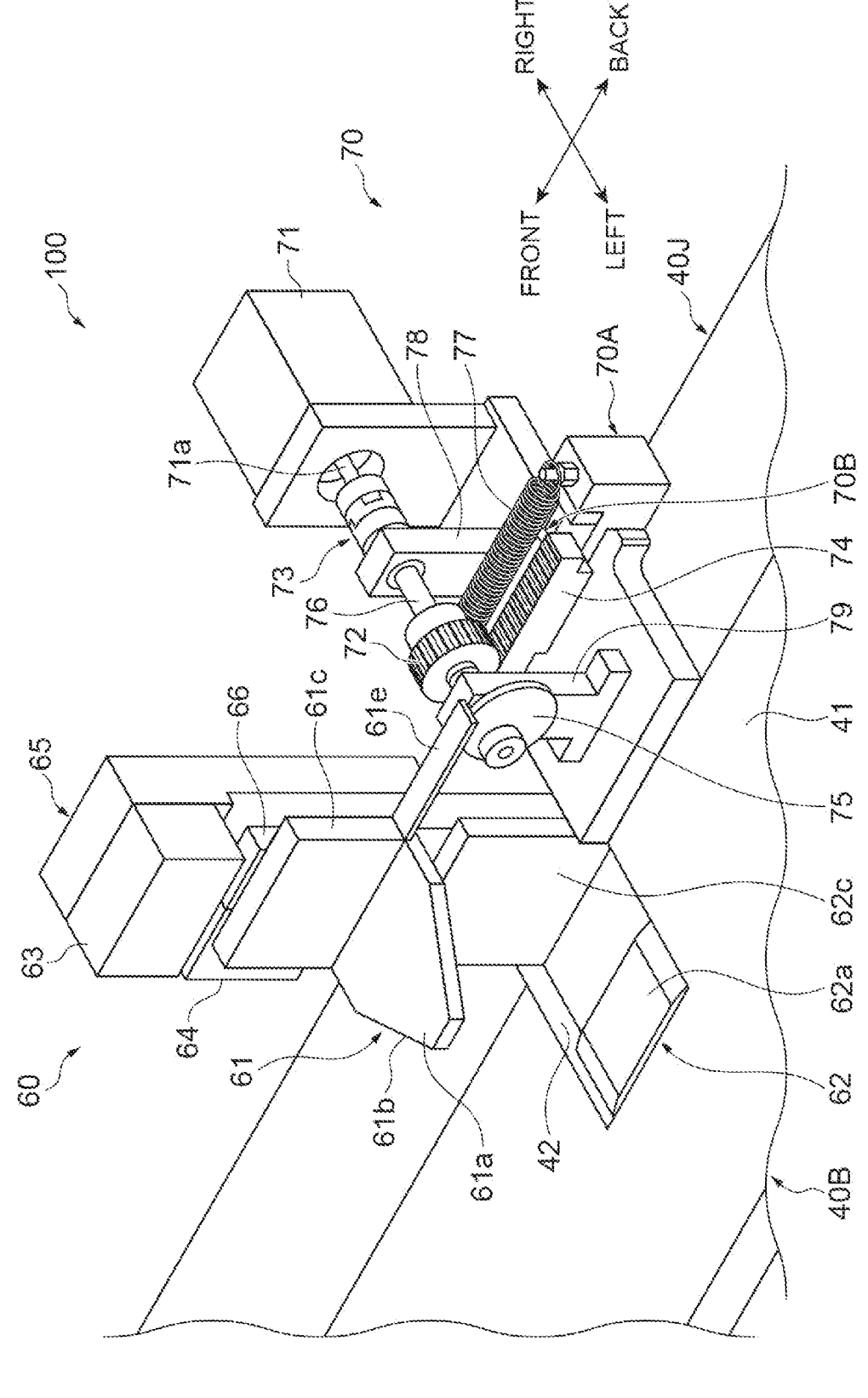
FIG. 5 is a perspective view illustrating a measurement device in FIG. 4 in an enlarged manner.
Figure 6:
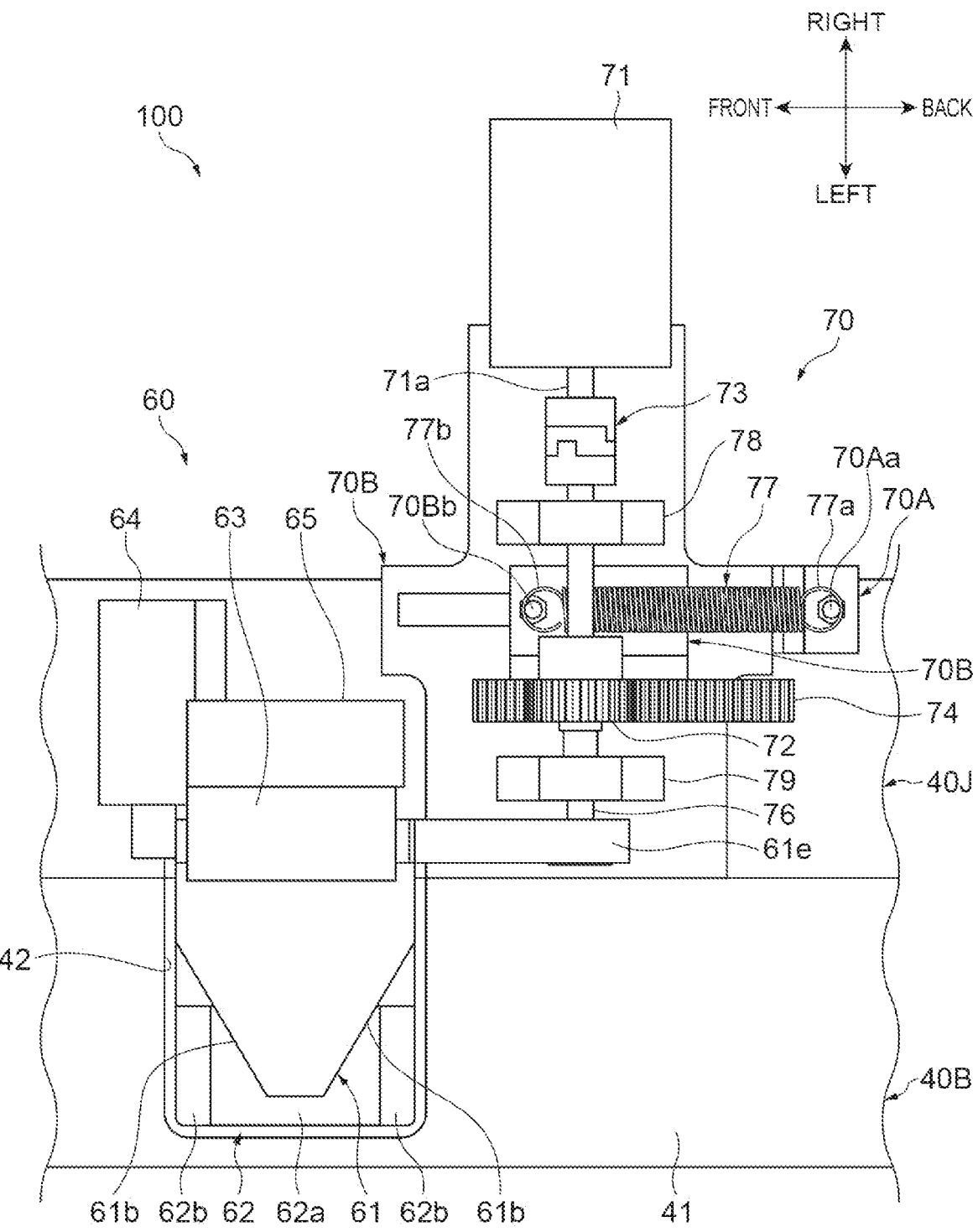
FIG. 6 is a plan view illustrating the measurement device in FIG. 4 in an enlarged manner.

The following describes the diameter measurement devices 100 in detail with reference to FIGS. 4 to 6. As illustrated in FIG. 4, a pair of extended portions 40J are provided on the left and right outer sides of the lower surface portions 40B. The extended portions 40J may be plate-like members similar to the lower surface portions 40B. The lower surface portions 40B and the extended portions 40J extend horizontally, for example. Each extended portion 40J may be installed such that the surface of the extended portion 40J is flush with a flat traveling surface 41 of the corresponding lower surface portion 40B. However, the extended portion 40J does not have to be configured to be flush with the lower surface portion 40B, and may form a step between the extended portion 40J and the lower surface portion 40B.

As illustrated in FIGS. 4 to 6, each diameter measurement device 100 is installed over the corresponding extended portion 40J and the corresponding lower surface portion 40B. The diameter measurement device 100 includes an upper measurement plate 61, a lower measurement plate 62, a plate-position detection unit 60 configured to detect the height positions of the upper measurement plate 61 and the lower measurement plate 62, and an actuator 70 configured to move the upper measurement plate 61 up and down.

As illustrated in FIGS. 5 and 6, the upper measurement plate 61 is a plate-like member configured to be brought into contact with the corresponding outer wheel 51 from above. The lower measurement plate 62 is a plate-like member configured to be brought into contact with the outer wheel 51 from below. The plate-position detection unit 60 includes an upper detector 63 configured to detect the height position of the upper measurement plate 61 and a lower detector 64 configured to detect the height position of the lower measurement plate 62.

In the diameter measurement device 100, the upper measurement plate 61 and the lower measurement plate 62 are movable up and down along a linear guide 66 fixed to a base 65 and extending in the vertical direction, for example. The base 65 is provided upright on the extended portion 40J. The vertical height of the base 65 is higher than the height of the upper end surface 51a of the outer wheel 51 rolling on the corresponding traveling surface 41. The upper detector 63 is attached to an upper end portion of the base 65, for example. For example, below the upper detector 63, the lower detector 64 is attached to the base 65. The linear guide 66 is fixed to a side of the base 65 facing the lower surface portion 40B.

The following describes a configuration associated with the upper measurement plate 61. The upper measurement plate 61 is biased upward by a spring 77 of the actuator 70. The upper measurement plate 61 is moved downward by the drive of the motor 71. More specifically, the upper measurement plate 61 includes: a vertical plate 61c attached to the base 65 with the linear guide 66 interposed therebetween, and slidable with respect to the base 65; a horizontal plate 61a protruding horizontally from the vertical plate 61c above the lower surface portion 40B; and an actuating piece 61e extending backward and horizontally from the vertical plate 61c and configured to be in contact with an eccentric cam 75 of the actuator 70. The vertical plate 61c, the horizontal plate 61a, and the actuating piece 61e slide in the vertical direction as an integral whole.

The actuator 70 includes a linear guide 70A fixed on the extended portion 40J and extending in the front-back direction and a slide portion 70B slidable along the linear guide 70A in the front-back direction. On the slide portion 70B, a rack gear 74 extending in the front-back direction is fixed. As illustrated in FIG. 6, between the linear guide 70A and the slide portion 70B, the spring 77 configured to bias the slide portion 70B toward the linear guide 70A is provided. The spring 77 is, for example, a tensile coil spring. For example, the fixed end 77a of the spring 77 is fastened to a fastening pin 70Aa provided upright on the linear guide

70A, and the moving end 77b of the spring 77 is fastened to a fastening pin 70Bb provided upright on the slide portion 70B. The slide portion 70B and the rack gear 74 slide in the front-back direction as an integral whole.

The actuator 70 includes a motor 71 fixed on the extended portion 40J and having an output shaft 71a extending in the left-right direction, a rotating shaft 76 connected to the output shaft 71a with a coupling 73 interposed therebetween, the eccentric cam 75 fixed to an end of the rotating shaft 76, and a gear 72 fixed to the rotating shaft 76 at an intermediate position between the motor 71 and the eccentric cam 75. The eccentric cam 75 and the gear 72 rotate with the rotation of the rotating shaft 76 extending in the left-right direction. The gear 72 is engaged with the rack gear 74. When the rotating shaft 76 and the gear 72 are rotated by the drive of the motor 71, the rack gear 74 and the slide portion 70B are moved away from the fastening pin 70Aa of the linear guide 70A against the biasing force of the spring 77. The actuator 70 may include a bearing 78 provided upright on the extended portion 40J and configured to support the rotating shaft 76. The actuator 70 may include an auxiliary receiver 79 provided upright on the extended portion 40J, through which the rotating shaft 76 is disposed.

Figure 7:
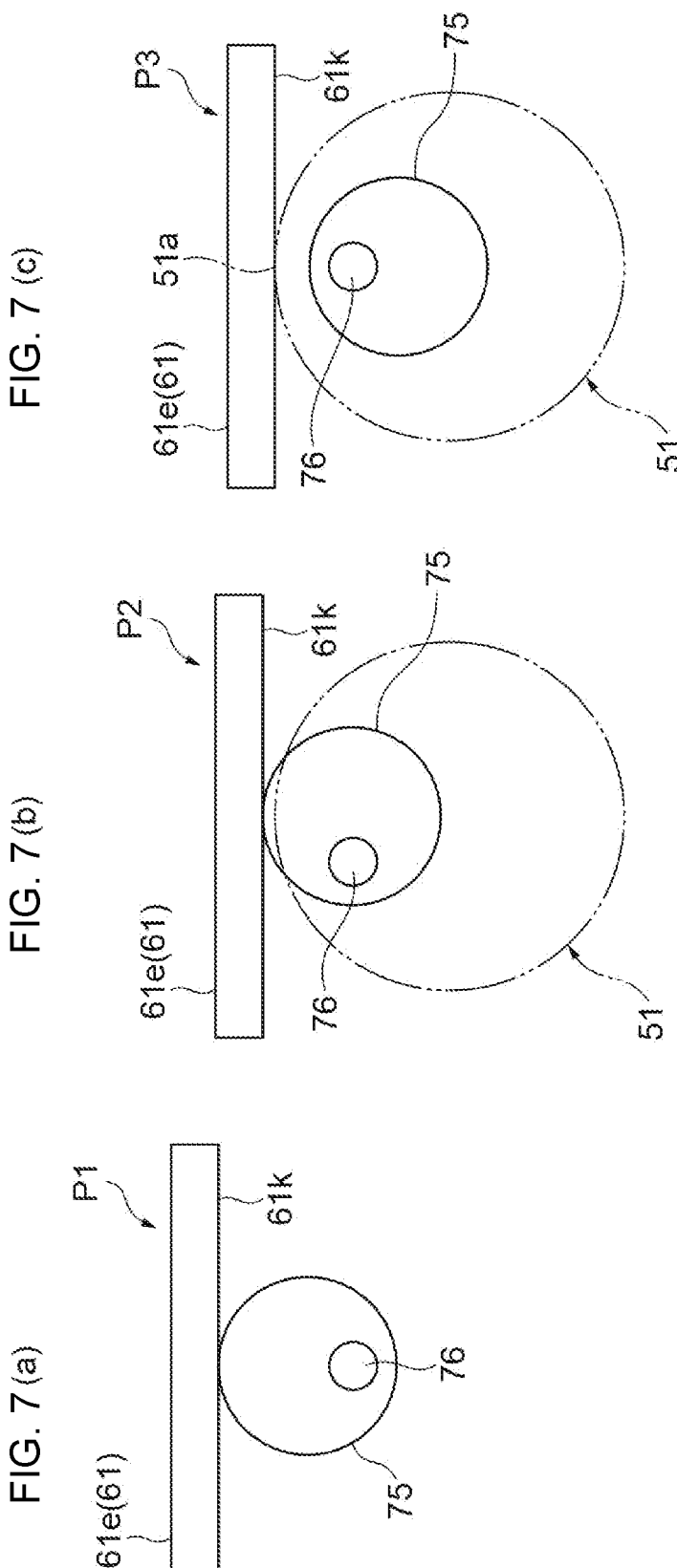
FIGS. 7(*a*) to 7(*c*) are diagrams illustrating the respective height positions when the upper measurement plate is moved up and down.

As illustrated in FIGS. 7(*a*) to 7(*c*), the eccentric cam 75 in a disc shape is mounted eccentrically on the rotating shaft 76. In an initial state, i.e., when the power of the motor 71 is shut off, the upper measurement plate 61 is biased to a retreat position P1 by the biasing force of the spring 77 as illustrated in FIG. 7(*a*). At this time, the contact surface 61k of the actuating piece 61e is in contact with the circumferential surface of the eccentric cam 75 and is pushed up by the eccentric cam 75. The actuating piece 61e is in a position farthest from the rotating shaft 76. When the upper measurement plate 61 is in the retreat position P1, the height of the horizontal plate 61a is higher than the height of the upper end surface 51a of the outer wheel 51 on the traveling surface 41. In other words, the upper measurement plate 61 is in the retreat position P1 away from the outer wheel 51.

When the rotating shaft 76 is rotated by the drive of the motor 71, the upper measurement plate 61 descends under its own weight while being in contact with the circumferential surface of the eccentric cam 75 as illustrated in FIG. 7(*b*). The upper measurement plate 61 is positioned in an intermediate position P2 that is midway through the descending. In the intermediate position P2, the contact surface 61k of the actuating piece 61e is in contact with the circumferential surface of the eccentric cam 75, but the height of the horizontal plate 61a is higher than the height of the upper end surface 51a of the outer wheel 51 on the traveling surface 41. FIGS. 7(*b*) and 7(*c*) are diagrams schematically illustrating the relation between the height position of the upper end surface 51a of the outer wheel 51 and the state of the eccentric cam 75, in which the outer wheel 51 is indicated by an imaginary line and is illustrated to be superimposed on the position of the eccentric cam 75. Actually, the outer wheel 51 is disposed at a position different from that of the eccentric cam 75 (e.g., forward and inward in the left-right direction from the eccentric cam 75) when viewed from the axial direction (left-right direction) of the outer wheel 51 and the eccentric cam 75. Thus, the horizontal plate 61a, with which the upper end surface 51a of the outer wheel 51 is brought into contact, is also disposed at a position different from that of the actuating piece 61e (e.g., forward and inward in the left-right direction from the actuating piece 61e). The height of the lower surface of the horizontal plate 61a (the surface that is brought into contact with the outer wheel 51) may be the same as the height of the contact surface 61k of the actuating piece 61e, but may be different therefrom.

When the rotating shaft 76 is further rotated by the drive of the motor 71, the upper measurement plate 61 is positioned in a contact position P3 where the horizontal plate 61a is brought into contact with the upper end surface 51a of the outer wheel 51 as illustrated in FIG. 7(c). In the contact position P3, the contact surface 61k of the actuating piece 61e is separated from the circumferential surface of the eccentric cam 75, and the height of the horizontal plate 61a is the same as the height of the upper end surface 51a of the outer wheel 51. For example, to move the upper measurement plate 61 from the retreat position P1 to the contact position P3, the rotating shaft 76 is rotated 180 degrees. The eccentric cam 75 does not have to have the disc shape, but may have any other shape (such as a non-circular shape) that can be used for known eccentric cams.

With the above-described configuration, the upper measurement plate 61 moves in conjunction with the rotational drive of the actuator 70 via the eccentric cam 75. The upper measurement plate 61 is raised to the retreat position P1 by the biasing force of the spring 77 when the power is shut off, and is lowered to the contact position P3 by the drive of the motor 71. The upper measurement plate 61 may be lowered from the retreat position to the contact position by directly pushing down the upper measurement plate 61 with a solenoid or other actuator. The lower end of a spring or the like may be directly attached to the upper measurement plate 61 such that the upper measurement plate 61 is biased upward to be raised from the contact position to the retreat position.

As illustrated in FIG. 4, at a position where the plate-position detection unit 60 is provided in each lower surface portion 40B, an inner wheel-supporting portion 40G having a rectangular shape and extending toward the other lower surface portion 40B is formed. In the upper measurement plate 61, a pair of oblique edges 61b (see FIG. 6) is formed such that the width thereof in the front-back direction decreases toward the inner wheel-supporting portion 40G in plan view. The function of the oblique edges 61b will be described later.

The following describes a configuration associated with the lower measurement plate 62. The lower measurement plate 62 is not provided with an actuator. The lower measurement plate 62 is biased upward by a spring 67 (see FIG. 8) attached to the base 65. The spring 67 is, for example, a tensile coil spring. The lower measurement plate 62 is moved downward by the entry of the outer wheel 51 (traveling vehicle 6). More specifically, as illustrated in FIG. 5, a rectangular opening 42 is formed in the lower surface portion 40B, corresponding to the position where the base 65 is attached. The lower measurement plate 62 includes: a vertical plate 62c attached to the base 65 with the linear guide 66 interposed therebetween, and slidable with respect to the base 65; and a contact plate 62a extending horizontally from the vertical plate 62c and disposed in the opening 42. The vertical plate 62c and the contact plate 62a slide in the vertical direction as an integral whole.

Figure 8:
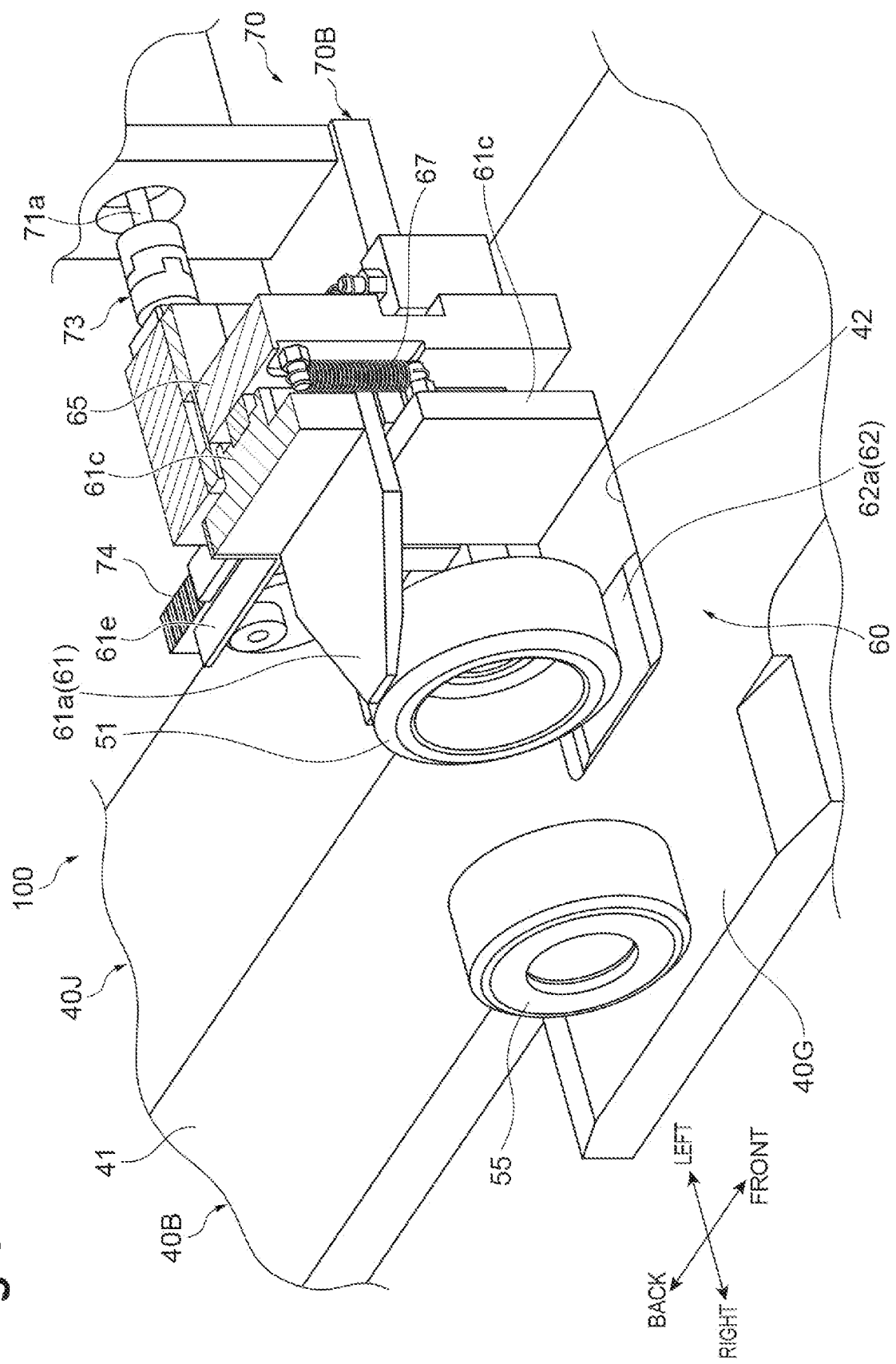
FIG. 8 is a perspective view illustrating a state in which a traveling roller has entered the measurement device and an upper measurement plate and a lower measurement plate are in contact with the traveling roller.
Figure 9:
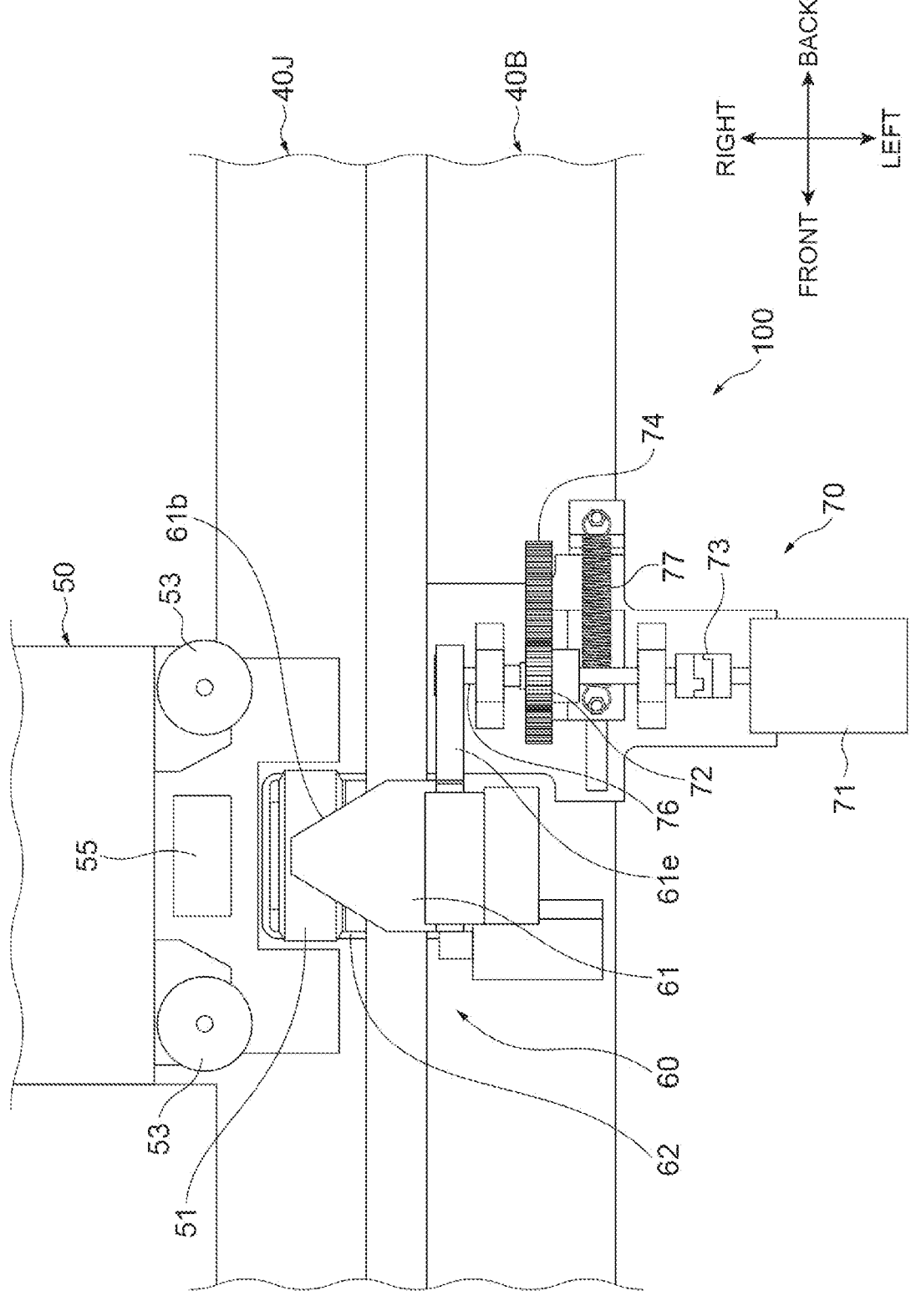
FIG. 9 is a plan view illustrating a positional relation between branching rollers of the traveling vehicle and the upper measurement plate.

In FIGS. 8 and 9, the (other diagonally located) diameter measurement device 100 other than the diameter measurement device 100 illustrated in FIGS. 5 and 6 are illustrated. One diameter measurement device 100 and the other diameter measurement device 100 have a symmetrical structure with respect to an imaginary plane orthogonal to the left-right direction, for example.

As illustrated in FIG. 5, the lower measurement plate 62 is biased upward to a standby position where it is able to be in contact with the outer wheel 51 in the initial state. In this state, the upper surface of the contact plate 62a protrudes slightly above the traveling surface 41 of the lower surface portion 40B, and is slightly higher than the traveling surface 41. On the front and the back of the contact plate 62a having a rectangular shape, inclined planes 62b are formed. Due to the inclined planes 62b, the heights of the front end and the rear end of the contact plate 62a in the initial state are slightly lower than the traveling surface 41. This configuration allows the outer wheel 51 rolling on the traveling surface 41 to smoothly ride on the contact plate 62a when it enters the area of the diameter measurement device 100.

The lower measurement plate 62 is moved downward by the entry of the outer wheel 51. The contact plate 62a is moved downward against the biasing force of the spring 67 while being in contact with the lower end surface of the outer wheel 51.

The upper detector 63 and the lower detector 64 are distance-measuring sensors. For example, as the upper detector 63 and the lower detector 64, for example, contact linear sensors can be used. The upper detector 63 can detect the height position of the upper measurement plate 61 (e.g., the horizontal plate 61a). The lower detector 64 can detect the height position of the lower measurement plate 62 (e.g., the contact plate 62a). When having detected the height positions of the upper measurement plate 61 and the lower measurement plate 62, the upper detector 63 and the lower detector 64 transmit detection signals indicating the height positions to, for example, the traveling vehicle controller of the traveling vehicle 6, the system controller 90, or another control device (not illustrated) provided in the traveling vehicle system 1. The traveling vehicle controller, the system controller 90, or the control device acquires the height positions of the upper measurement plate 61 and the lower measurement plate 62, and calculates the diameter of the outer wheel 51.

The following describes a method of measuring the diameter of the outer wheel 51 in the diameter measurement device 100 with reference to FIG. 8. To begin with, the control device of the diameter measurement device 100 detects the arrival of a traveling vehicle 6 by a sensor (not illustrated). As illustrated in FIG. 8, the inner wheel 55 of the traveling vehicle 6 (another part, another traveling roller separate from the traveling roller) rides on the inner wheel-supporting portion 40G, and is supported by the inner wheel-supporting portion 40G. This allows the attitude of the traveling vehicle 6 in the vertical direction to be maintained. The outer wheel 51 enters onto the contact plate 62a of the lower measurement plate 62. The contact plate 62a is moved slightly downward, and the upper surface of the contact plate 62a is approximately aligned with the height of the traveling surface 41. The inner wheel-supporting portion 40G receives the dead weight (load) of the traveling vehicle 6 via the inner wheel 55, and thus no significant load is applied to the contact plate 62a.

Thus, no significant load is also applied to the outer wheel 51, and the outer wheel 51 is prevented from being changed by the load. In this state, the motor 71 is driven, whereby the upper measurement plate 61 is moved downward. With the contact plate 62a being in contact with the lower end surface of the outer wheel 51 and the horizontal plate 61a being in contact with the upper end surface 51a of 51, the height positions are detected by the upper detector 63 and the lower detector 64, and the diameter is calculated by the control device or other device. The timing of calculating the diameter may be after a predetermined time has elapsed after the arrival of the traveling vehicle 6, or when the detection values by the upper detector 63 and the lower detector 64 have stabilized.

When the traveling vehicle 6 enters the position of the diameter measurement device 100, there may be a situation in which the branching rollers 53 (see FIG. 3) of the traveling vehicle 6 are not located in predetermined positions to protrude leftward (or rightward, i.e., toward the upper measurement plate 61). With the outer wheel 51 rolling on the lower surface portion 40B, the height of the branching rollers 53 can interfere with the horizontal plate 61*a* of the upper measurement plate 61. In other words, within the vertical movable range of the horizontal plate 61*a* (the range from the retreat position P1 to the contact position P3), the branching rollers 53 are located. In the example illustrated in FIG. 9, the branching rollers 53 are located in predetermined positions and do not protrude. In the unlikely event that the branching rollers 53 are protruding, the branching rollers 53 can be retracted rightward (or leftward) when the traveling vehicle 6 moves with the branching rollers 53 being in contact with the oblique edges 61*b* of the horizontal plate 61*a*. The oblique edges 61*b* formed on the horizontal plate 61*a* allow the diameter of the outer wheel 51 to be measured without hindrance by eliminating the state of interfering with the branching rollers 53, even if interference therewith has occurred.

In the traveling vehicle system 1 according to the present example, the upper measurement plate 61 and the lower measurement plate 62 are brought into contact with the outer wheel 51 above and below the outer wheel 51. The diameter of the outer wheel 51 is measured by detecting the height positions of the upper measurement plate 61 and the lower measurement plate 62 by the upper detector 63 and the lower detector 64. As described above, only two plates need to be brought in contact with the outer wheel 51, and thus the diameter of the outer wheel 51 can be easily measured. Unlike conventional optical measurement, the height positions of the plates are detected by using physical contact, which enables accurate measurement of the diameter. The two upper and lower plates are disposed in positions where the rolling area (passing area) of the outer wheel 51 is kept away therefrom. Thus, the configuration can be further simplified than when, for example, two plates are used on the left and right sides.

The lower measurement plate 62 is biased upward to the standby position where it is able to be in contact with the outer wheel 51, and is moved downward by the entry of the outer wheel 51. This eliminates the need for an actuator configured to move the lower measurement plate 62 up and down, which allows the structure of diameter measurement device 100 to be simpler.

The upper measurement plate 61 is biased upward to the contact position P3 where it is separated from the outer wheel 51 in the initial state. Thus, even if, for example, the actuator 70 configured to move the upper measurement plate 61 up and down fails, collision between the upper measurement plate 61 and the outer wheel 51 can be prevented.

With the attitude of the traveling vehicle 6 being maintained by the inner wheel 55, the upper measurement plate 61 and the lower measurement plate 62 are brought into contact with the outer wheel 51. This can prevent the outer wheel 51 from being deformed by load such as the dead weight of the traveling vehicle 6. Thus, the diameter of the outer wheel 51 can be measured more accurately.

The attitude of the traveling vehicle 6 is maintained by using the inner wheel 55 that is a configuration originally provided for the traveling vehicle 6 to travel. Thus, the diameter of the outer wheel 51 can be easily and accurately measured.

The diameter measurement device 100 is incorporated in a midpoint of the traveling rail 4 or is provided on an extension of the traveling rail 4. Thus, the diameter of the outer wheel 51 could be measured after the traveling vehicle 6 is moved along the traveling rail 4 to the position of the diameter measurement device 100. The traveling vehicle 6 does not have to be moved to a position separated from the traveling rail 4.

Although an example has been described above, this disclosure is not limited to the above-described example. For example, in the above example, a configuration of measuring the diameter of the outer wheel 51 has been described. However, the diameter measurement device 100 may also measure the diameter of the inner wheel 55. In the traveling vehicle 6, any one of the outer wheel 51 and the inner wheel 55 may be omitted. In this example, any other one of the outer wheel 51 and inner wheel 55 corresponds to the traveling roller to be measured. In this example, another part of the traveling vehicle 6 separate from the traveling roller (the outer wheel 51 or the inner wheel 55) may be supported by any part of the rail body 40 (traveling rail 4) to maintain the attitude of the traveling vehicle 6. The attitude of the traveling vehicle 6 is maintained and the dead weight (load) of the traveling vehicle 6 is applied to this other part, whereby deformation of the traveling roller (the outer wheel 51 or the inner wheel 55) is prevented. Thus, the diameter of the traveling roller can be accurately measured.

In the above example, a configuration has been described in which the upper measurement plate 61 is biased to the retreat position P1 by the biasing force of the spring 77 (see FIG. 7(*a*)) when the power is shut off. However, other means (biasing means) may be provided to bias the upper measurement plate 61 upward. For example, without using the spring 77, a pulley and a weight or the like may be used to bias the upper measurement plate 61 upward. Other known biasing means may be used for the upper measurement plate 61. The configuration to bias the lower measurement plate 62 upward is also not limited to the spring 67. Without using the spring 67, a pulley and a weight or the like may be used to bias the lower measurement plate 62 upward. Other known biasing means may be used for the lower measurement plate 62.

In the above example, a configuration has been described in which the attitude of the traveling vehicle 6 is maintained by the inner wheel 55 that is another traveling roller. However, the attitude of the traveling vehicle 6 may be maintained by another part of the traveling vehicle 6 separate from the traveling roller.

An example has been described in which the upper detector 63 and the lower detector 64 are provided separately as detectors. However, a single detector may detect the height positions of the upper measurement plate 61 and the lower measurement plate 62.

The shapes of the upper measurement plate 61 and the lower measurement plate 62 can be changed as needed. The actuator 70 for the upper measurement plate 61 may be omitted. Similarly to the lower measurement plate 62 in the above example, the upper measurement plate 61 may wait while being biased downward and be pushed up (moved upward) by the entry of the outer wheel 51 (traveling roller). The diameter measurement device 100 may be provided in a position separated from the traveling rail 4.

In the above example, a configuration has been described in which this disclosure is applied to the traveling rail 4 for allowing the traveling vehicle 6 to travel in a suspended manner. However, this disclosure may be applied to a traveling vehicle system in which a traveling vehicle travels in a traveling rail disposed on the ground. In the above example, the traveling vehicle 6 is caused to travel by the drive of the traveling unit 50 during measurement by the measurement unit 110. However, instead of or in addition to this, the traveling vehicle 6 may be caused to travel (moved) by another device or the like.

The invention claimed is:

1. A traveling vehicle system in which a traveling vehicle including a traveling roller travels on a rail and a measurement device is provided, the measurement device comprising:

an upper measurement plate configured to be brought into contact with the traveling roller from above;

a lower measurement plate configured to be brought into contact with the traveling roller from below; and a detector configured to detect height positions of the upper measurement plate and the lower measurement plate.

2. The traveling vehicle system according to claim 1, wherein the lower measurement plate is biased upward to a standby position where the lower measurement plate is able to be in contact with the traveling roller, and is moved downward by entry of the traveling roller.

3. The traveling vehicle system according to claim 1, wherein the upper measurement plate is biased upward to a retreat position where the upper measurement plate is separated from the traveling roller.

4. The traveling vehicle system according to claim 1, wherein, with attitude of the traveling vehicle being maintained by another part of the traveling vehicle separate from the traveling roller, the upper measurement plate and the lower measurement plate are brought into contact with the traveling roller.

5. The traveling vehicle system according to claim 4, wherein the other part is another traveling roller separate from the traveling roller.

6. The traveling vehicle system according to claim 1, wherein the measurement device is incorporated in a midpoint of the rail or is provided on an extension of the rail.

* * * * *